United States Patent
Tada et al.

(10) Patent No.: US 8,630,750 B2
(45) Date of Patent: Jan. 14, 2014

(54) METHOD OF CONTROLLING STEERING CONTROL EQUIPMENT FOR AIRCRAFT, AND STEERING CONTROL EQUIPMENT FOR AIRCRAFT AND AIRCRAFT PROVIDED THEREWITH

(75) Inventors: Kazunari Tada, Hyogo (JP); Kazushi Furuichi, Hyogo (JP); Yutaro Minami, Hyogo (JP)

(73) Assignee: Sumitomo Precision Products Co, Ltd., Hyogo (JP)

( * ) Notice: Subject to any disclaimer, the term of this patent is extended or adjusted under 35 U.S.C. 154(b) by 330 days.

(21) Appl. No.: 13/275,571

(22) Filed: Oct. 18, 2011

(65) Prior Publication Data

US 2012/0101664 A1 Apr. 26, 2012

(30) Foreign Application Priority Data

Oct. 20, 2010 (JP) ................................. 2010-235169

(51) Int. Cl.
*G01C 23/00* (2006.01)
*B64C 25/50* (2006.01)

(52) U.S. Cl.
USPC ............................................... 701/3; 244/50

(58) Field of Classification Search
None
See application file for complete search history.

(56) References Cited

U.S. PATENT DOCUMENTS

| 3,885,759 | A  | * | 5/1975 | Lear ................................ 244/50 |
| 5,008,825 | A  | * | 4/1991 | Nadkarni et al. ................. 701/4 |
| 6,722,610 | B1 | * | 4/2004 | Rawdon et al. .......... 244/103 W |
| 6,928,363 | B2 | * | 8/2005 | Sankrithi ...................... 701/120 |
| 7,445,178 | B2 | * | 11/2008 | McCoskey et al. ............. 244/50 |
| 2004/0059497 | A1 | * | 3/2004 | Sankrithi ...................... 701/120 |

FOREIGN PATENT DOCUMENTS

JP 2008-168656 7/2008

* cited by examiner

*Primary Examiner* — Mussa A Shaawat
(74) *Attorney, Agent, or Firm* — Miller, Matthias & Hull LLP

(57) ABSTRACT

A steering control equipment has a controller having a provisional-target-angular-position calculating section calculating a provisional target angular position of a steering mechanism corresponding to the operation amounts of a steering handle and rudder pedals, a speed setting section setting the aircraft speed on the basis of detected ground speed and airspeed, a target-angular-position limiting section outputting the provisional target angular position as a final target angular position when the calculated provisional target angular position is equal to or lower than a limit value corresponding to the set speed and outputting the limit value as a final target angular position when the calculated provisional target angular position is larger than the limit value, and a actuating control section controlling an actuating mechanism for actuating the steering mechanism so that the output final target angular position and the actual angular position of the steering mechanism detected coincide with each other.

9 Claims, 9 Drawing Sheets

METHOD OF CONTROLLING STEERING CONTROL EQUIPMENT FOR AIRCRAFT, AND STEERING CONTROL EQUIPMENT FOR AIRCRAFT AND AIRCRAFT PROVIDED THEREWITH

TECHNICAL FIELD

The present disclosure relates to a method of controlling a steering control equipment which changes the traveling direction of an aircraft by changing the angular position of a steering mechanism of the aircraft while the aircraft is taxiing, and such a steering control equipment and an aircraft provided therewith.

BACKGROUND ART

Conventional steering control equipment is disclosed in the Japanese Unexamined Patent Application Publication No. 2008-168656, for example. This steering control equipment comprises an actuating mechanism for actuating a steering mechanism to change its angular position, an angular-position detecting sensor for detecting the actual angular position of the steering mechanism, a steering handle and rudder pedals with which the pilot manipulates the steering mechanism, operation-amount detecting sensors for detecting the operation amount of the steering handle and the operation amount of the rudder pedals, and a controller for calculating, on the basis of the operation amounts of the steering handle and the rudder pedals detected by the operation-amount detecting sensors, target angular positions of the steering mechanism (target angular positions when rotating the steering mechanism) based on the operation amount of the steering handle and based on the operation amount of the rudder pedals and adding them up, and actuating the actuating mechanism on the basis of the added-up target angular position and the actual angular position detected by the angular-position detecting sensor so that they coincide with each other.

Further, in addition to the above-described steering control equipment, there is suggested a steering control equipment in which, because the aircraft may swerve from a runway or may overturn if the traveling direction of the aircraft is turned large while taxiing at high speed, in order to prevent this from occurring, the added-up target angular position is changed into a target angular position corresponding to the traveling speed and the angle of the turn of the traveling direction of the aircraft is set so that it becomes smaller as the traveling speed of the aircraft increases.

It is noted that, as a specific method of changing the target angular position into a target angular position corresponding to the traveling speed, there are two methods, for example. In the first method, the target angular position is compared with a limit value corresponding to the traveling speed, and the target angular position is set as a final target angular position when the target angular position is equal to or lower than the limit value, and the limit value is set as a final target angular position when the target angular position is larger than the limit value. In the second method, a value is obtained by multiplying the target angular position by a gain corresponding to the traveling speed, which is then set as a final target angular position.

SUMMARY OF DISCLOSURE

By the way, in order to change the added-up target angular position into a target angular position corresponding to the traveling speed, it is necessary to detect the traveling speed of the aircraft. As a method of detecting the traveling speed of an aircraft, there can be given, for example, a method in which the speed of the aircraft relative to the ground (ground speed) is detected by a wheel-rotation-speed detecting sensor mounted on the main landing gears, a method in which the speed of the aircraft relative to the air (airspeed) is detected by a pitot tube mounted on the body, and a method in which the speed of the aircraft is calculated on the basis of position information obtained from the GPS.

However, where the ground speed is detected by a wheel-rotation-speed detecting sensor, the detected speed is 0 when the wheel is locked at the time of braking and it is therefore not possible to detect an accurate speed. Where the airspeed is detected by a pitot tube, the detection is easily affected by wind direction (head wind, fair wind) and wind speed and the detected speed is higher than the actual speed when a head wind blows, and is lower than the actual speed when a fair wind blows, and it is therefore not possible to detect the accurate speed. Further, the resolution of the speed calculation based on position information from the GPS is low, and, although this speed calculation is applicable during flight, it is not suitable during taxiing.

Therefore, conventionally, it has been impossible to set a target angular position of a steering mechanism of an aircraft to a suitable value which corresponds to the traveling speed of the aircraft.

In view of the above-described circumstances, an object of the present disclosure is to provide a method of controlling a steering control equipment, with which it is possible to set a target angular position of a steering mechanism to an appropriate angular position corresponding to traveling speed using a more appropriate traveling speed of the aircraft, and such a steering control equipment and an aircraft provided therewith.

The present disclosure relates to a method of controlling a steering control equipment for aircraft which changes the traveling direction of an aircraft by changing the angular position of a steering mechanism of the aircraft while the aircraft is taxiing, characterized by including:

a detection step of detecting the speed of the aircraft relative to the ground as ground speed and detecting the speed of the aircraft relative to the air as airspeed and detecting the actual angular position of the steering mechanism;

a speed setting step of setting the speed of the aircraft on the basis of the ground speed and airspeed detected in the detection step;

a calculation step of calculating, on the basis of the operation amount of manipulating means with which a pilot manipulates the steering mechanism and the speed set in the speed setting step, a target angular position of the steering mechanism corresponding to them, and an actuating step of, on the basis of the actual angular position of the steering mechanism detected in the detection step and the target angular position calculated in the calculation step, actuating the steering mechanism so that they coincide with each other.

This control method can be suitably performed by the steering control equipment below.

That is, the steering control equipment comprises: manipulating means with which a pilot manipulates the steering mechanism, actuating means for actuating the steering mechanism, angular-position detecting means for detecting the actual angular position of the steering mechanism, ground-speed detecting means for detecting the speed of the aircraft relative to the ground as ground speed, airspeed detecting means for detecting the speed of the aircraft relative to the air as airspeed, and control means for causing the actuating means to change the angular position of the steering mechanism, the control means having:

a speed setting section for setting the speed of the aircraft on the basis of the ground speed detected by the ground-speed detecting means and the airspeed detected by the airspeed detecting means;

a target-angular-position calculating section for, on the basis of the operation amount of the manipulating means and the speed set by the speed setting section, calculating a target angular position of the steering mechanism corresponding to them; and an actuating control section for, on the basis of the actual angular position detected by the angular-position detecting means and the target angular position calculated by the target-angular-position calculating section, actuating the actuating means so that they coincide with each other.

According to this steering control equipment, while the aircraft is taxiing, the speed of the aircraft relative to the ground is detected as ground speed by the ground-speed detecting means and the speed of the aircraft relative to the air is detected as airspeed by the airspeed detecting means, and the actual angular position of the steering mechanism is detected by the angular-position detecting means. Further, the speed (traveling speed) of the aircraft is set by the speed setting section on the basis of the detected ground speed and airspeed.

Further, once the pilot operates the manipulating means, on the basis of the operation amount of the manipulating means and the speed set by the speed setting section, a target angular position of the steering mechanism corresponding thereto is calculated by the target-angular-position calculating section. It is noted that, depending on the speed, the target angular position calculated by the target-angular-position calculating section is constant or the calculated value or the calculated range is smaller when the speed is higher, for example.

On the basis of the calculated target angular position and the actual angular position detected by the angular-position detecting means, the actuating control section actuates the actuating means so that they coincide with each other. Thereby, the angular position of the steering mechanism is changed, and thereby the traveling direction of the aircraft is changed.

Thus, according to the method of controlling steering control equipment and the steering control equipment of the present disclosure, since the speed set by the speed setting section on the basis of the ground speed and the airspeed is used for the calculation of target angular position, it is possible to use a more appropriate speed as compared with a case where merely the ground speed is used and a case where merely the airspeed is used. Therefore, it is possible to cause the target angular position to have an appropriate value which corresponds to the speed.

It is noted that, in a case where the manipulating means has a steering handle and rudder pedals with which the pilot manipulates the steering mechanism, and is configured to output the operation amount of the steering handle and the operation amount of the rudder pedals, that is, in a case where the manipulating means has two types of manipulating parts, a target angular position can be calculated using the speed set by the speed setting section in a manner as described below.

That is, a configuration is possible in which: the target-angular-position calculating section has a handle-part calculation section for calculating, on the basis of the operation amount of the steering handle output from the manipulating means, a target angular position of the steering mechanism corresponding thereto, a pedal-part calculation section for calculating, on the basis of the operation amount of the rudder pedals output from the manipulating means, a target angular position of the steering mechanism corresponding thereto, and a target-angular-position adding section for adding up the target angular positions calculated by the handle-part calculation section and the pedal-part calculation section; at least one of the handle-part calculation section and the pedal-part calculation section is configured to calculate, on the basis of the operation amount and the speed set by the speed setting section, a target angular position of the steering mechanism corresponding thereto; and the actuating control section is configured to, on the basis of the actual angular position detected by the angular-position detecting means and the target angular position added up by the target-angular-position adding section, actuate the actuating means so that they coincide with each other.

Alternatively, a configuration is possible in which: the target-angular-position calculating section has a handle-part calculation section for calculating, on the basis of the operation amount of the steering handle output from the manipulating means, a provisional target angular position of the steering mechanism corresponding thereto, a pedal-part calculation section for calculating, on the basis of the operation amount of the rudder pedals output from the manipulating means, a provisional target angular position of the steering mechanism corresponding thereto, a target-angular-position adding section for adding up the provisional target angular positions calculated by the handle-part calculation section and the pedal-part calculation section, and a final-target-angular-position calculating section for calculating, on the basis of the provisional target angular position added up by the target-angular-position adding section and the speed set by the speed setting section, a final target angular position corresponding thereto; and the actuating control section is configured to, on the basis of the actual angular position detected by the angular-position detecting means and the target angular position calculated by the final-target-angular-position calculating section, actuate the actuating means so that they coincide with each other.

Alternatively, a configuration is possible in which: the target-angular-position calculating section has a handle-part calculation section for calculating, on the basis of the operation amount of the steering handle output from the manipulating means, a provisional target angular position of the steering mechanism corresponding thereto, a pedal-part calculation section for calculating, on the basis of the operation amount of the rudder pedals output from the manipulating means, a provisional target angular position of the steering mechanism corresponding thereto, a target-angular-position adding section for adding up the provisional target angular positions calculated by the handle-part calculation section and the pedal-part calculation section, and a final-target-angular-position calculating section for calculating, on the basis of the provisional target angular position added up by the target-angular-position adding section and the speed set by the speed setting section, a final target angular position corresponding thereto; at least one of the handle-part calculation section and the pedal-part calculation section is configured to calculate, on the basis of the operation amount, and the speed detected by the ground-speed detecting means or the airspeed detecting section or the speed set by the speed setting section, a provisional target angular position of the steering mechanism corresponding thereto; and the actuating control section is configured to, on the basis of the actual angular position detected by the angular-position detecting means and the target angular position calculated by the final-target-angularposition calculating section, actuate the actuating means so that they coincide with each other.

Here, the steering handle is a manipulating part for changing the traveling direction of the aircraft by actuating only the steering mechanism, and the rudder pedals is a manipulating part for changing the traveling direction of the aircraft by actuating both of the steering mechanism and the rudder of the vertical tail.

Further, the speed setting section may be configured to set the speed of the aircraft to the ground speed when the ground speed or the airspeed is lower than a reference speed at and above which it is not necessary to control the angular position of the steering mechanism by means of the steering handle, and set the speed of the aircraft to the airspeed when the ground speed or the airspeed is equal to or higher than the reference speed.

Generally, the steering mechanism is manipulated by the steering handle mainly when the aircraft moves between an apron and a runway, and at this time the traveling speed is low and the traveling direction of the aircraft is often turned by a large angle. On the other hand, the steering mechanism is manipulated by the rudder pedals mainly when the aircraft runs on a runway at the time of taking-off and at the time of landing, and at this time the traveling speed is high and the steering mechanism is manipulated to tweak the traveling direction. Further, since, when the rudder pedals is manipulated, not only the angular position of the steering mechanism but also the angular position of the rudder of the vertical tail is changed in association therewith, the traveling direction of the aircraft is changed also by the rudder when the traveling speed is high. Therefore, it is necessary to take into consideration the steering effect of the rudder when the traveling speed is high.

As described above, the steering handle is often used at the time of low-speed traveling, and when the speed is lower than the reference speed, the calculation of a target angular position corresponding to the ground speed makes it possible to prevent the occurrence of disadvantages which occur when a target angular position corresponding to the airspeed is calculated, such as disadvantages that a speed higher than the actual speed is detected due to head winds and the traveling direction therefore cannot be turned by a large angle and that a speed lower than the actual speed is detected due to fair winds and the traveling direction is therefore turned by an angle larger than that at the time of the actual speed. On the other hand, the rudder pedals is often used at the time of high-speed traveling, and when the speed is equal to or higher than the reference speed, the calculation of a target angular position corresponding to the airspeed makes it possible to prevent the occurrence of disadvantages which occur when an target angular position corresponding to the ground speed is calculated, such as a disadvantage that, when the steering effect of the rudder is greater than the actual speed due to head winds, the traveling direction is easily changed and it is therefore difficult to tweak the traveling direction.

Further, the speed setting section may be configured to switch the speed of the aircraft between the ground speed, the airspeed and the reference speed. In this case, when the speed of the aircraft is set to the ground speed, the speed setting section initially checks whether the ground speed is equal to or higher than the reference speed. When a judgment is made that the ground speed is lower than the reference speed, the speed of the aircraft remains set to the ground speed, and when a judgment is made that the ground speed is equal to or higher than the reference speed, another check is made whether the airspeed is equal to or higher than the reference speed. When a judgment is made that the airspeed is equal to or higher than the reference speed, the speed of the aircraft is set to the airspeed, and when a judgment is made that the airspeed is lower than the reference speed, the speed of the aircraft is set to the reference speed.

Furthermore, the speed setting section may be configured to switch the speed of the aircraft between the ground speed, the airspeed and the reference speed. In this case, when the speed of the aircraft is set to the airspeed, the speed setting section checks whether the ground speed is lower than the reference speed. When a judgment is made that the ground speed is lower than the reference speed, the speed of the aircraft is set to the ground speed, and when a judgment is made that the ground speed is equal to or higher than the reference speed, the speed of the aircraft remains set to the airspeed. Alternatively, the speed setting section initially checks whether the ground speed is lower than the reference speed. When a judgment is made that the ground speed is equal to or higher than the reference speed, the speed of the aircraft remains set to the airspeed, and when a judgment is made that the ground speed is lower than the reference speed, another check is made whether the airspeed is lower than the ground speed. When a judgment is made that the airspeed is lower than the ground speed, the speed of the aircraft is set to the ground speed, and when a judgment is made that the airspeed is equal to or higher than the ground speed, the speed of the aircraft remains set to the airspeed. Alternatively, the speed setting section initially checks whether the airspeed is lower than the reference speed, and when a judgment is made that the airspeed is equal to or higher than the reference speed, the speed of the aircraft remains set to the airspeed, and when a judgment is made that the airspeed is lower than the reference speed, another check is made whether the airspeed is higher than the ground speed. When a judgment is made that the airspeed is higher than the ground speed, the speed of the aircraft is set to the ground speed, and when a judgment is made that the airspeed is equal to or lower than the ground speed, the speed of the aircraft remains set to the airspeed.

Furthermore, the speed setting section may be configured to switch the speed of the aircraft between the ground speed, the airspeed and the reference speed. In this case, when the speed of the aircraft is set to the reference speed, the speed setting section checks whether the airspeed is equal to or higher than the reference speed. When a judgment is made that the airspeed is equal to or higher than the reference speed, the speed of the aircraft is set to the airspeed, and when a judgment is made that the airspeed is lower than the reference speed, the speed of the aircraft remains set to the reference speed.

In a case where uniformly the speed of the aircraft is set to the ground speed when the speed is lower than the reference speed and to the airspeed when the speed is equal to or higher than the reference speed as aforementioned, it can be possible that, when the ground speed is not equal to the airspeed, the switching between the ground speed and the airspeed causes discontinuity of the calculated target angular positions, which results in deterioration of the controllability. Therefore, by switching the speed of the aircraft between the ground speed, the airspeed and the reference speed in the above-described manner, discontinuity of the calculated target angular positions and the deterioration of the controllability caused thereby can be prevented, which is more preferable.

It is noted that, when calculating a target angular position (including a provisional target angular position and a target angular position corresponding to the operation amount) or a target angular position corresponding to the operation amount and the speed of the aircraft (including a final target angular position and a provisional target angular position), the calculation may be performed by comparing a target angular position with a limit value corresponding to the speed and setting the target angular position as the target angular position to be calculated when the target angular position is equal to or lower than the limit value and setting the limit value as the target angular position to be calculated when the target angular position is larger than the limit value, by setting a value obtained by multiplying a target angular position by a gain corresponding to the speed as the target angular position to be calculated, or by setting, as the target angular position to be calculated, a value obtained by referring to a map in which a target angular position is set corresponding to the operation amount and the speed or corresponding to the target angular position and the speed.

Further, the present disclosure relates to an aircraft characterized by having a steering mechanism for changing the traveling direction during taxiing and the above-described steering control equipment for changing the angular position of the steering mechanism, and the same effect as that described above can be obtained also on this aircraft.

As described above, according to the control method for steering control equipment and the steering control equipment and the aircraft provided therewith of the present disclosure, using a more appropriate traveling speed of the aircraft makes it possible to calculate a suitable target angular position of the steering mechanism which corresponds to the traveling speed.

DETAILED DESCRIPTION

Hereinafter, a specific embodiment of the present disclosure will be described on the basis of the accompanying drawings.

Figure 1:
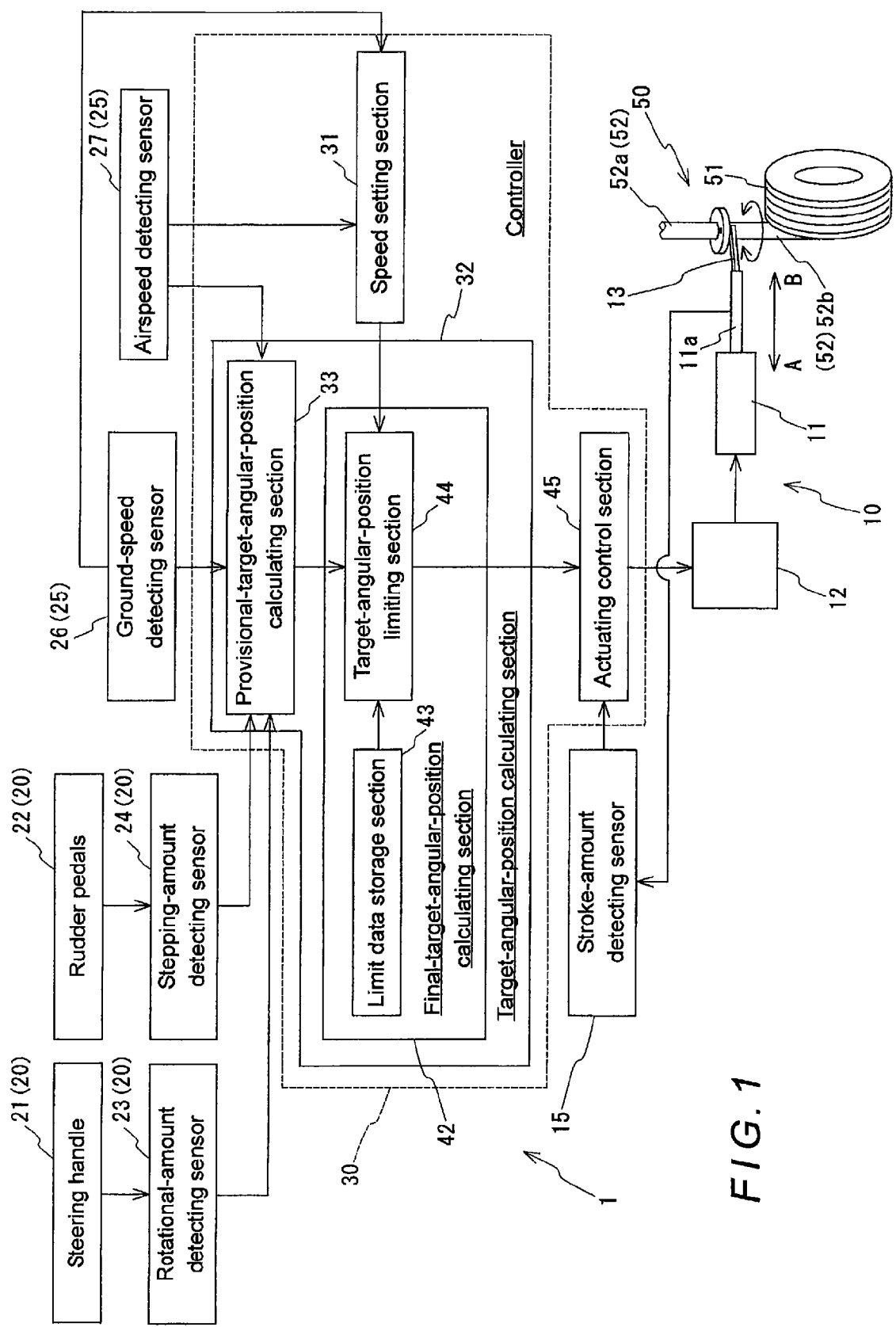
FIG. 1 is a schematic diagram showing a schematic configuration of a steering control equipment and other components according to one embodiment of the present disclosure.

As shown in FIG. 1, an aircraft of the present embodiment has a nose landing gear 50 configured by a steering mechanism 51 and a landing gear strut 52 supporting the steering mechanism 51 to be rotatable about its axis, and a steering control equipment 1 which changes the traveling direction of the aircraft by changing the angular position of the steering mechanism 51 according to the control by the pilot during taxiing.

Figure 2:
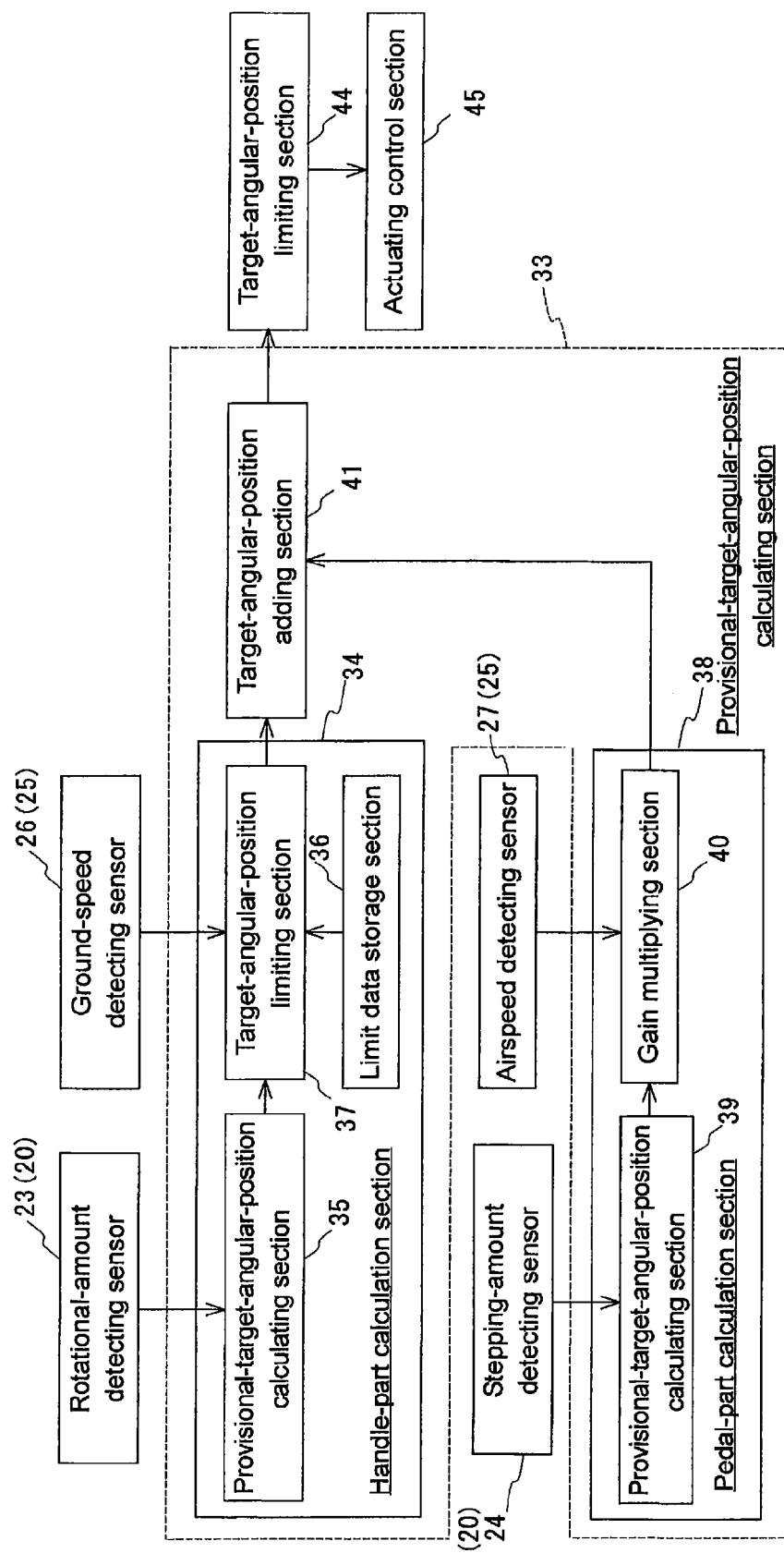
FIG. 2 is a schematic diagram showing a schematic configuration of a provisional-target-angular-position calculating section and other components according to the embodiment.
Figure 3:
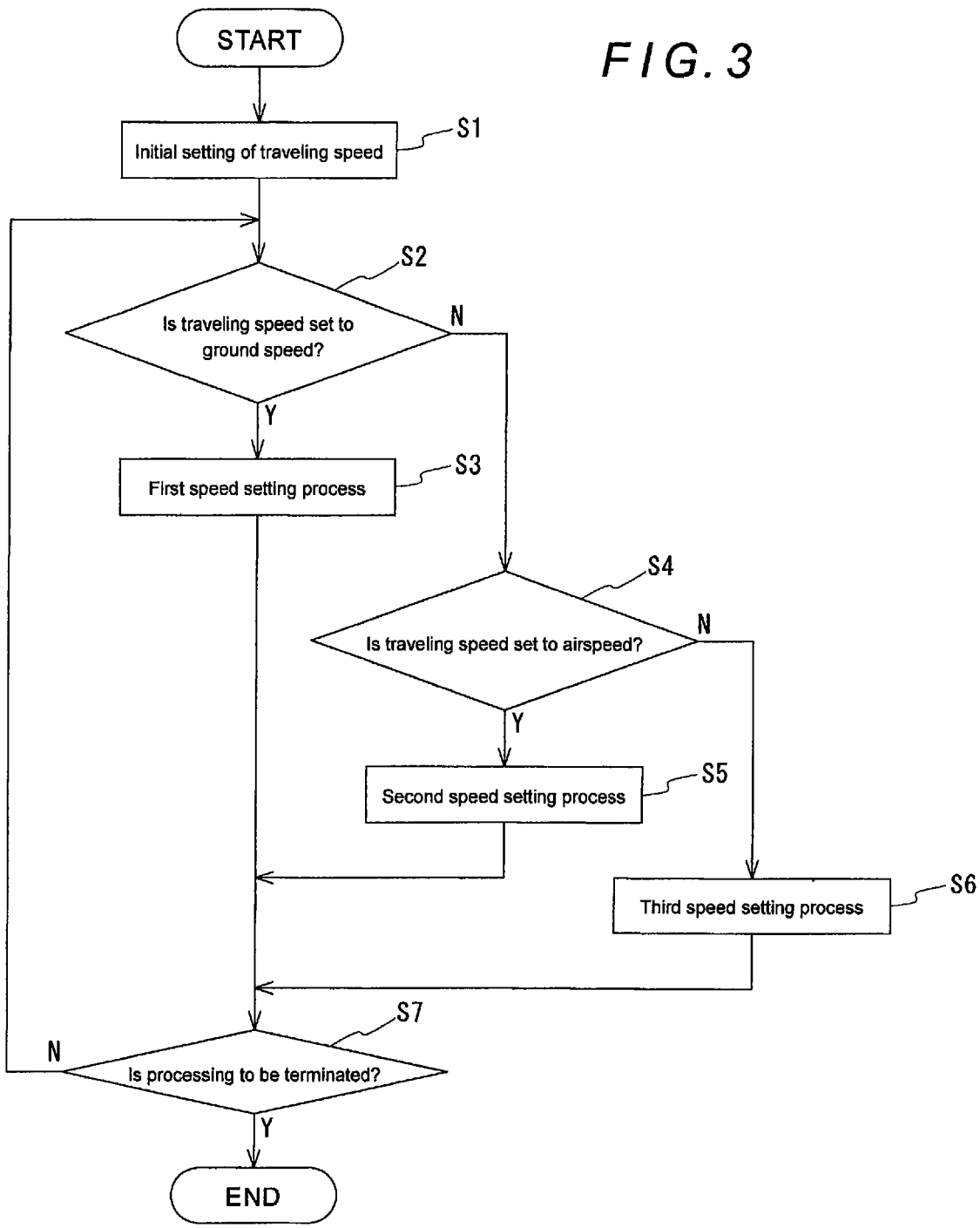
FIG. 3 is a flowchart showing a sequence of processing steps in a speed setting section according to the embodiment.

The steering control equipment 1 has, as shown in FIGS. 1 and 2, an actuating mechanism 10 for actuating the steering mechanism 51, a stroke-amount detecting sensor 15 for detecting the actual angular position of the steering mechanism 51, an manipulating section 20 with which the pilot manipulates the steering mechanism 51, a speed detecting section 25 for detecting the speed (traveling speed) of the aircraft, and a controller 30 for controlling the actuating mechanism 10 on the basis of the operation amount of the manipulating section 20, the actual angular position detected by the stroke-amount detecting sensor 15 and the speed detected by the speed detecting section 25.

The actuating mechanism 10 comprises a hydraulic cylinder 11 having a driving rod 11a movable in the axial direction (in the directions indicated by the arrows A and B), and a hydraulic pressure supplying section 12 for supplying pressure oil into the hydraulic cylinder 11 to thereby move the driving rod 11a in the axial direction. The distal end of the driving rod 11a of the hydraulic cylinder 11 is connected to a lower portion 52b of the landing gear strut 52 via a linkage part 13, an upper portion 52a of the landing gear strut 52 being fixed on the body of the aircraft. The movement of the driving rod 11a in the axial direction causes the lower portion 52b of the landing gear strut 52 to be rotationally moved about its axis with respect to the upper portion 52a, and thereby the direction of the steering mechanism 51 (the angular position of the steering mechanism 51) is changed.

The stroke-amount detecting sensor 15 detects the stroke amount of the driving rod 11a as the actual angular position of the steering mechanism 51.

The manipulating section 20 comprises a steering handle 21, rudder pedals 22 comprising two pedals, a rotational-amount detecting sensor 23 for detecting the operation amount (rotational amount) of the steering handle 21, and a stepping-amount detecting sensor 24 for detecting the operation amount (stepping amount) of the rudder pedals 22. It is noted that when the rudder pedals 22 are stepped on, not only the angular position of the steering mechanism 51 but also the angular position of the rudder of the vertical tail is changed in association therewith.

The rotational-amount detecting sensor 23 detects the rotational amount of the steering handle 21 as a positive displacement amount when the steering handle 21 is rotated to the right, and detects the rotational amount of the steering handle 21 as a negative displacement amount when the steering handle 21 is rotated to the left.

The stepping-amount detecting sensor 24 detects the stepping amount of one pedal of the two pedals of the rudder pedals 22 as a positive displacement amount when the one pedal is stepped on, and detects the stepping amount of the other pedal of the two pedals of the rudder pedals 22 as a negative displacement amount when the other pedal is stepped on.

The speed detecting section 25 comprises a ground-speed detecting sensor 26 for detecting the traveling speed of the aircraft relative to the ground as ground speed and an airspeed detecting sensor 27 for detecting the traveling speed of the aircraft relative to the air as airspeed. The ground-speed detecting sensor 26 is configured by a rotation-speed detecting sensor provided on the nose landing gear 50 or a main landing gear (not shown) and detects the ground speed by detecting the rotation speed of the steering mechanism 51 or of the wheel of the main landing gear (not shown). The airspeed detecting sensor 27 is configured by a pitot tube provided on the body of the aircraft.

The controller 30 comprises a speed setting section 31, a target-angular-position calculating section 32 and an actuating control section 45, and the target-angular-position calculating section 32 comprises a provisional-target-angular-position calculating section 33 and a final-target-angular-position calculating section 42.

The speed setting section 31 executes a sequence of processing steps as shown in FIGS. 3 to 6 to thereby switch, on the basis of the ground speed detected by the ground-speed detecting sensor 26 and the airspeed detected by the airspeed detecting sensor 27, between the ground speed, the airspeed and a reference speed (80 knot in the embodiment) that is a speed at and above which it is not necessary to control the angular position of the steering mechanism 51 by means of the steering handle 21, thereby setting the traveling speed of the aircraft.

That is, the speed setting section 31 initially performs an initial setting, for example, sets the traveling speed to the ground speed detected by the ground-speed detecting sensor 26 (Step S1), and then checks whether the traveling speed is set to the ground speed detected by the ground-speed detecting sensor 26 (Step S2). When a judgment is made that the traveling speed is set to the ground speed, a first speed setting process is performed (Step S3).

Figure 4:
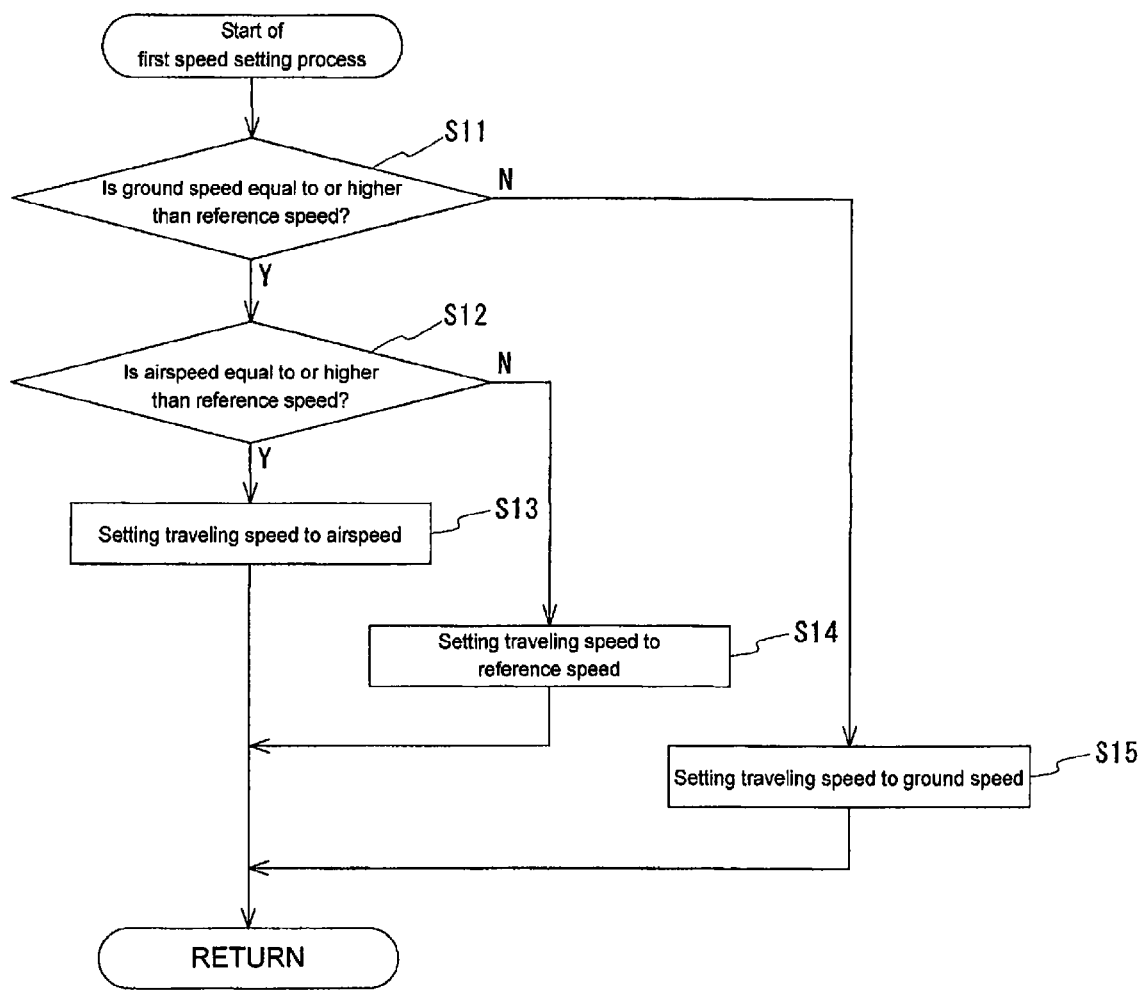
FIG. 4 is a flowchart showing a first speed setting process in the speed setting section according to the embodiment.

The first speed setting process is executed as described below. As shown in FIG. 4, initially, a check is made whether the ground speed is equal to or higher than the reference speed (step S11). When a judgment is made that the ground speed is equal to or higher than the reference speed, another check is made whether the airspeed is equal to or higher than the reference speed (Step S12), and when a judgment is made that the airspeed is equal to or higher than the reference speed, the traveling speed is set to the airspeed (Step S13).

On the other hand, when in Step S12 a judgment is made that the airspeed is not equal to or higher than the reference speed, the traveling speed is set to the reference speed (Step S14). Further, when in Step S11 a judgment is made that the ground speed is not equal to or higher than the reference speed, the traveling speed remains set to the ground speed (Step S15). After the traveling speed is set to any one of the ground speed, the airspeed and the reference speed, the processing is returned to the main process shown in FIG. 3.

When in Step S2 a judgment is made that the traveling speed is not set to the ground speed, another check is made whether the traveling speed is set to the airspeed detected by the airspeed detecting sensor 27 (Step S4). When a judgment is made that the traveling speed is set to the airspeed, a second speed setting process is performed (Step S5), and when a judgment is made that the traveling speed is not set to the airspeed, a third speed setting process is performed (Step S6).

Figure 5:
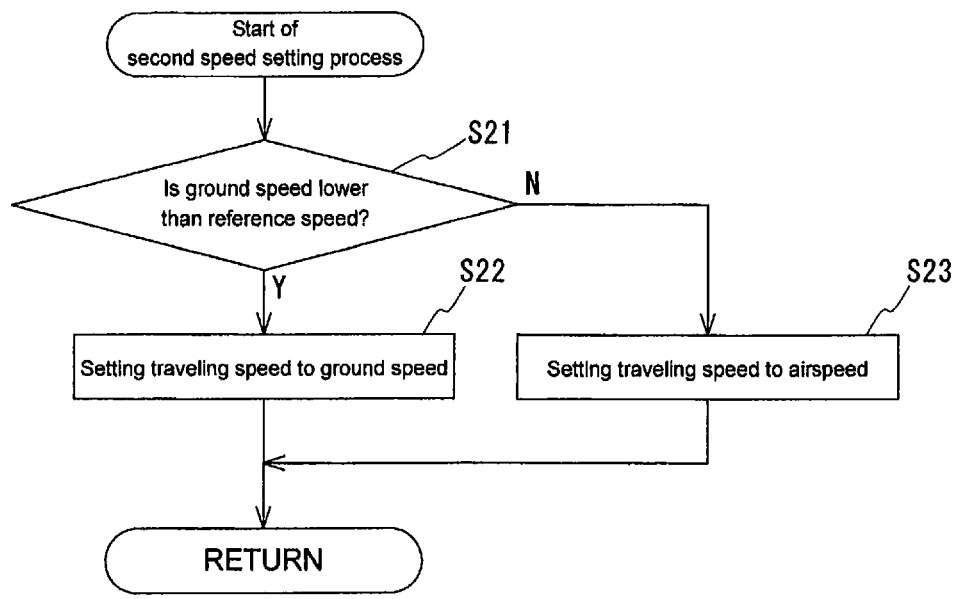
FIG. 5 is a flowchart showing a second speed setting process in the speed setting section according to the embodiment.

The second speed setting process and the third speed setting process are executed as described below. For the second speed setting process, as shown in FIG. 5, initially, a check is made whether the ground speed is lower than the reference speed (Step S21). When a judgment is made that the ground speed is lower than the reference speed, the traveling speed is set to the ground speed (Step S22), and when a judgment is made that the ground speed is equal to or higher than the reference speed, the traveling speed remains set to the airspeed (Step S23). After the traveling speed is set to any one of the ground speed and the airspeed, the processing is returned to the main process shown in FIG. 3.

Figure 6:
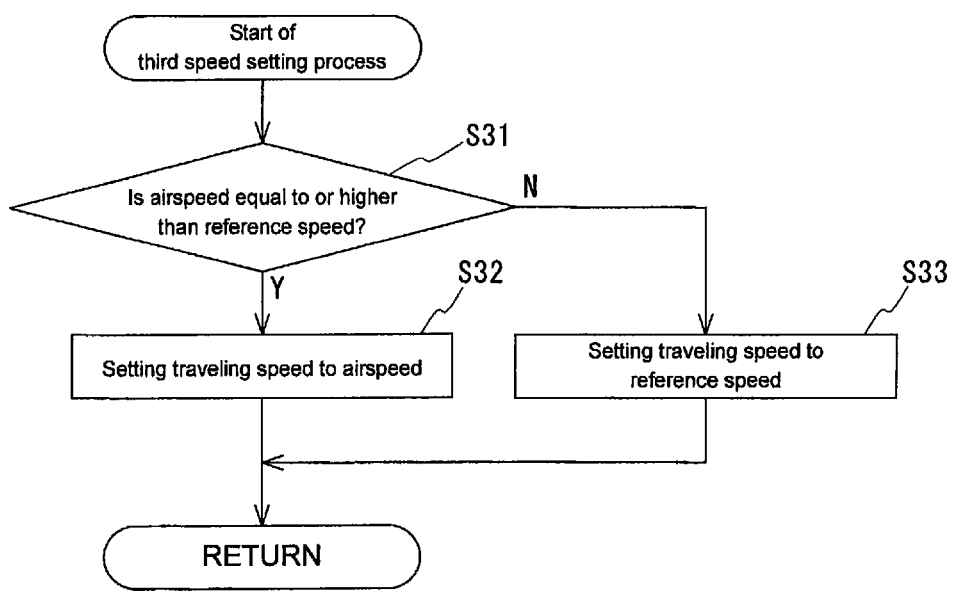
FIG. 6 is a flowchart showing a third speed setting process in the speed setting section according to the embodiment.

On the other hand, for the third speed setting process, as shown in FIG. 6, initially, a check is made whether the airspeed is equal to or higher than the reference speed (Step S31). When a judgment is made that the airspeed is equal to or higher than the reference speed, the traveling speed is set to the airspeed (Step S32), and when a judgment is made that the airspeed is lower than the reference speed, the traveling speed remains set to the reference speed (Step S33). After the traveling speed is set to any one of the airspeed and the reference speed, the processing is returned to the main process shown in FIG. 3.

After the speed setting process of any one of Steps S3, S5, S6 is terminated, a check is made whether the sequence of processing steps is to be terminated (Step S7), and when the sequence of processing steps is not to be terminated, the processes of Step S2 and the subsequent steps are repeated.

The provisional-target-angular-position calculating section 33 has a handle-part calculation section 34 for calculating, on the basis of the rotational amount of the steering handle 21 detected by the rotational-amount detecting sensor 23 and the traveling speed (ground speed) detected by the ground-speed detecting sensor 26, a provisional target angular position of the steering mechanism 51 corresponding thereto, a pedal-part calculation section 38 for calculating, on the basis of the stepping amount of the rudder pedals 22 detected by the stepping-amount detecting sensor 24 and the traveling speed (airspeed) detected by the airspeed detecting sensor 27, a provisional target angular position of the steering mechanism 51 corresponding thereto, and a target-angular-position adding section 41 for adding up the provisional target angular positions detected by the handle-part calculation section 34 and the pedal-part calculation section 38.

The handle-part calculation section 34 comprises a provisional-target-angular-position calculating section 35, a limit data storage section 36 and a target-angular-position limiting section 37, and the provisional-target-angular-position calculating section 35 calculates, on the basis of the rotational amount of the steering handle detected by the rotational-amount detecting sensor 23, a first provisional target angular position of the steering mechanism 51 corresponding thereto.

Figure 7:
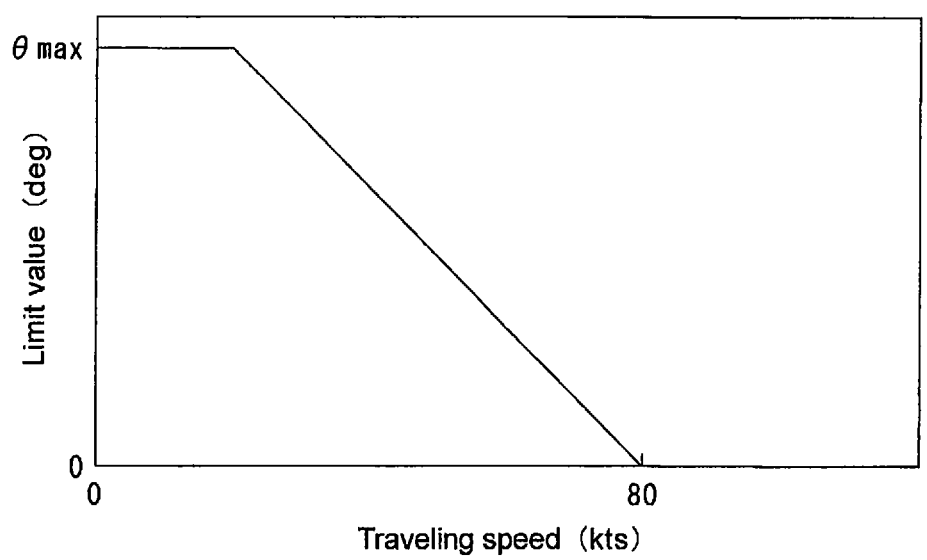
FIG. 7 is a graph showing limit data stored in a limit data storage section (limit data for limiting a provisional target angular position in a handle-part calculation section) according to the embodiment.

The limit data storage section 36 has limit data of target angular position of the steering mechanism 51 stored therein, the data being set according to the traveling speed of the aircraft. The limit data is set depending on the characteristics of the aircraft and the operating conditions and is represented by, for example, a graph as shown in FIG. 7. In this graph, the limit value is constant at θ max between the traveling speed of 0 and a predetermined speed, and the limit value becomes linearly smaller in proportion to the traveling speed between the predetermined speed and the speed of 80 knot so that the limit value is 0 at the speed of 80 knot.

It is noted that the speed of 80 knot is a speed at and above which the limit value can be 0 (a reference speed), that is, a speed at and above which it is not necessary to control the angular position of the steering mechanism 51 by means of the steering handle 21. The θ max is the maximum angular position to which the steering mechanism 51 can be mechanically steered. Further, although FIG. 7 shows the limit for when the steering handle 21 is rotated to the right (the rotational angular position in the positive direction), similar limit data is set for when the steering handle 21 is rotated to the left (the rotational angular position in the negative direction).

Figure 8:
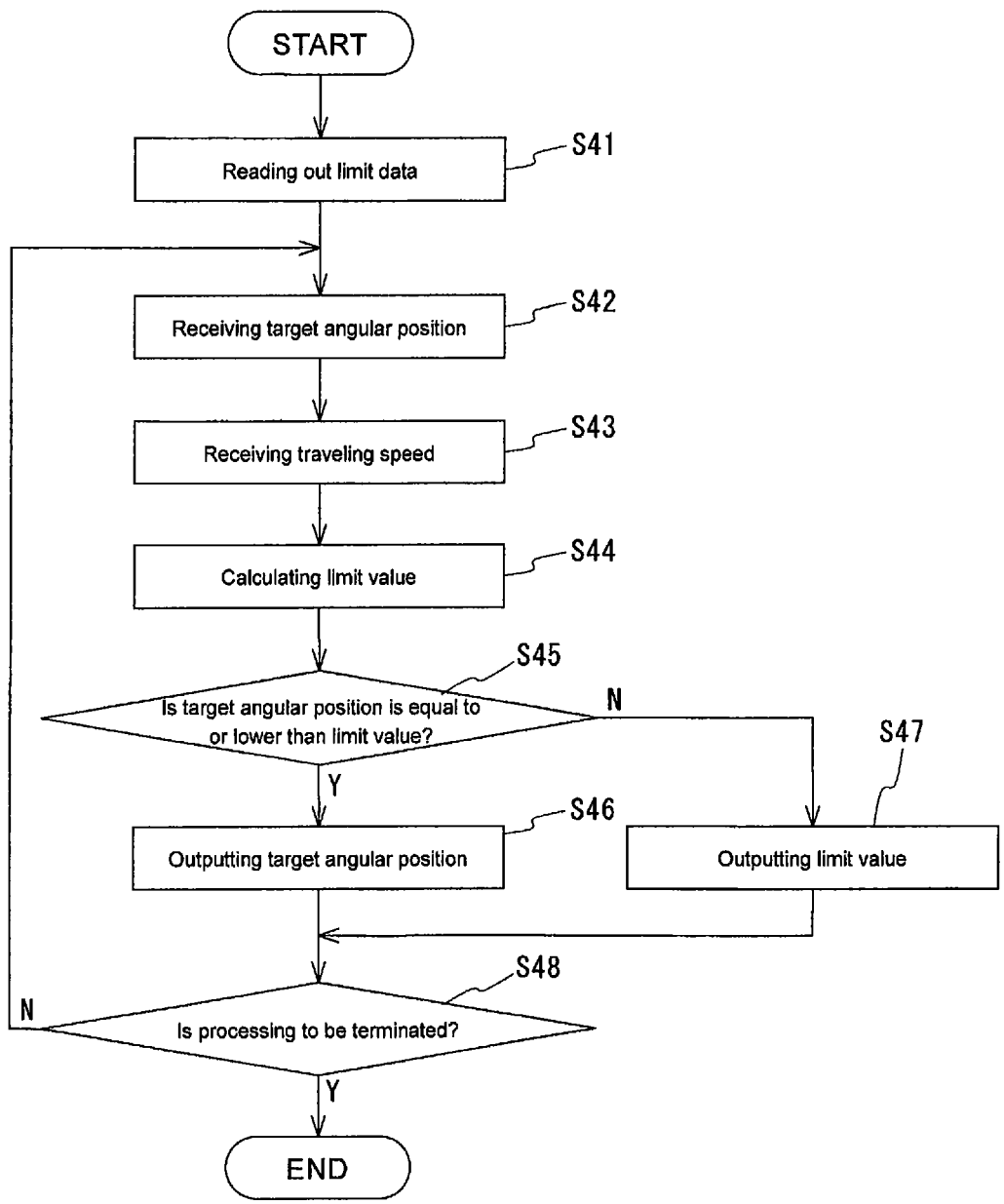
FIG. 8 is a flowchart showing a sequence of processing steps in a target-angular-position limiting section according to the embodiment.

The target-angular-position limiting section 37 executes a sequence of processing steps as shown in FIG. 8 to thereby limit a first provisional target angular position calculated by the provisional-target-angular-position calculating section 35. That is, the target-angular-position limiting section 37 initially reads out the limit data stored in the limit data storage section 36 (Step S41), receives the first provisional target angular position calculated by the provisional-target-angular-position calculating section 35 (Step S42), receives the traveling speed (ground speed) detected by the ground-speed detecting sensor 26 (Step S43), and calculates a limit value corresponding to the traveling speed on the basis of the read-out limit data and the received traveling speed (Step S44).

Subsequently, the received first provisional target angular position is compared with the calculated limit value to check whether the first provisional target angular position is equal to or lower than the limit value (step S45). When a judgment is made that the first provisional target angular position is equal to or lower than the limit value, the received first provisional target angular position is output as a second provisional target angular position (Step S46), and when a judgment is made that the first provisional target angular position is larger than the limit value, the calculated limit value is output as a second target angular position (Step S47). It is noted that, although in the step S45 the limit for the rotational angular position in the positive direction is given as an example, for the rotational angular position in the negative direction, a check is made whether the provisional target angular position is equal to or larger than the limit value, and when the first provisional target angular position is equal to or larger than the limit value, the received first provisional target angular position is output as a second provisional target angular position, and when a judgment is made that the first provisional target angular position is smaller than the limit value, the calculated limit value is output as a second provisional target angular position.

Thereafter, in Step S48, a check is made whether the sequence of processing steps is to be terminated, when the sequence of processing steps is not to be terminated, the processes of Step S42 and the subsequent steps are repeated.

The pedal-part calculation section 38 comprises a provisional-target-angular-position calculating section 39 and a gain multiplying section 40. The provisional-target-angular-position calculating section 39 calculates, on the basis of the stepping amount of the rudder pedals 22 detected by the stepping-amount detecting sensor 24, a first provisional target angular position of the steering mechanism 51 corresponding thereto, and the gain multiplying section 40 multiplies, on the basis of the first provisional target angular position calculated by the provisional-target-angular-position calculating section 39 and the traveling speed (airspeed) detected by the airspeed detecting sensor 27, the first provisional target angular position by a gain corresponding to the traveling speed to thereby calculate a second provisional target angular position.

Figure 9:
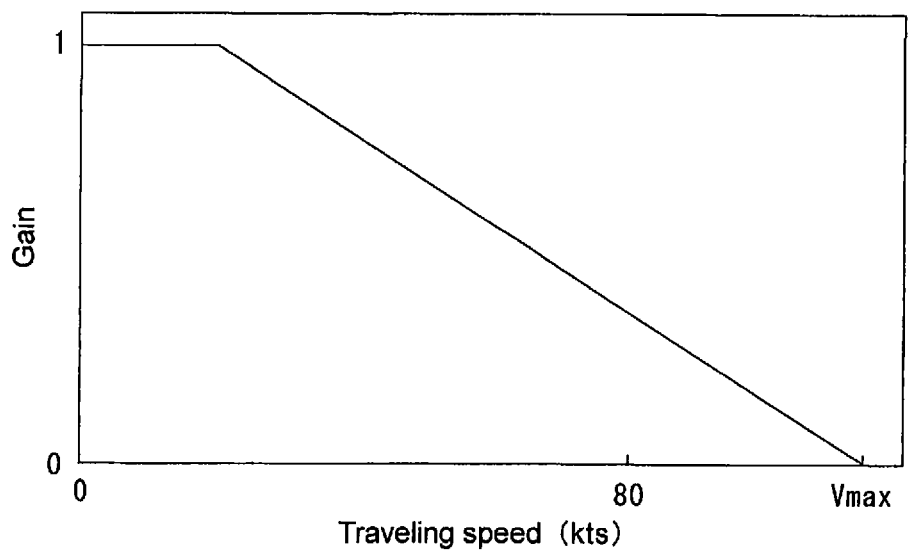
FIG. 9 is a graph showing a gain used in a gain multiplying section according to the embodiment.

It is noted that the gain is set depending on the characteristics of the aircraft and the operating conditions, and is expressed by, for example, a graph as shown in FIG. 9. In this graph, the gain is constant at 1 from the traveling speed of 0 to a predetermined speed, and becomes linearly smaller in proportion with the traveling speed between the predetermined speed and the speed of Vmax so that the gain becomes 0 at the Vmax, the speed of Vmax being higher than 80 knot and being the maximum traveling speed at which the steering control is necessary.

The target-angular-position adding section 41 added up the second provisional target angular position output from the target-angular-position limiting section 37 and the second provisional target angular position calculated by the gain multiplying section 40. For example, when the provisional target angular position output from the target-angular-position limiting section 37 is 20° and the provisional target angular position calculated by the gain multiplying section 40 is 5°, the provisional target angular position after the addition is 25°.

Figure 10:
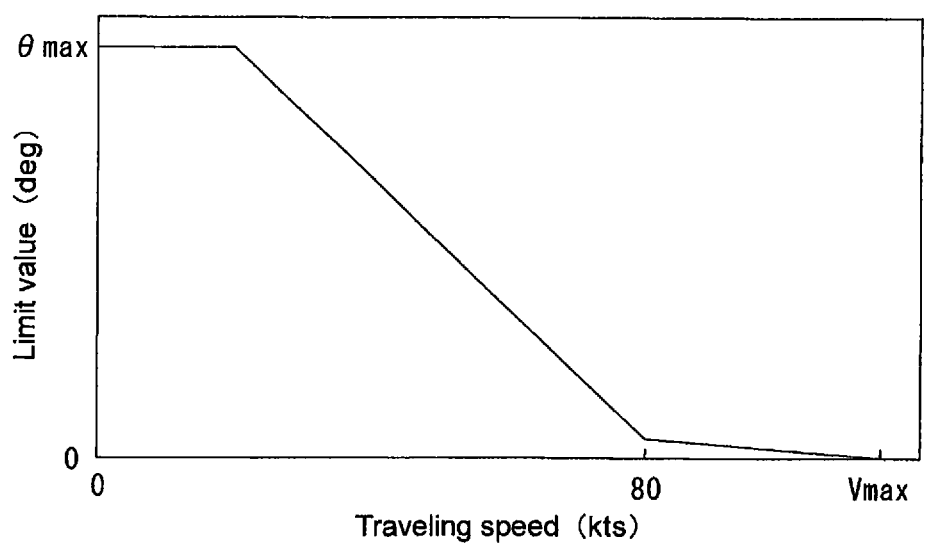
FIG. 10 is a graph showing limit data stored in the limit data storage section (limit data for limiting an added-up provisional target angular position) according to the embodiment.

The final-target-angular-position calculating section 42 comprises a limit data storage section 43 and a target-angular-position limiting section 44. The limit data storage section 43 has, similarly to the limit data storage section 36, limit data of target angular position of the steering mechanism 51 stored therein, the data being set according to the traveling speed of the aircraft. This limit data is set depending on the characteristics of the aircraft and the operating conditions, and is expressed by, for example, a graph as shown in FIG. 10. In this graph, the limit value is constant at θ max from the traveling speed of 0 to a predetermined speed, becomes linearly smaller in proportion with the traveling speed between the predetermined speed and the speed of 80 knot, and becomes linearly smaller in proportion with the traveling speed between the speed of 80 knot and the speed of Vmax so that the limit value becomes 0 at the Vmax and the inclination of the portion between the speed of 80 knot and the speed of Vmax is smaller than that of the portion between the predetermined speed and the speed of 80 knot.

It is noted that, although FIG. 10 shows the limit for when the steering handle 21 is rotated to the right (the rotational angular position in the positive direction), similar limit data is set for when the steering handle 21 is rotated to the left (the rotational angular position in the negative direction).

The target-angular-position limiting section 44, similarly to the target-angular-position limiting section 37, executes a sequence of processing steps as shown in FIG. 8 to thereby limit the provisional target angular position added up by the target-angular-position adding section 41. That is, the target-angular-position limiting section 44 initially reads out the limit data stored in the limit data storage section 43 (Step S41), receives the provisional target angular position added up by the target-angular-position adding section 41 (Step S42), receives the traveling speed set by the speed setting section 31 (Step S43), and calculates, on the basis of the read-out limit data and the received traveling speed, a limit value corresponding to the traveling speed (Step S44).

Subsequently, the received provisional target angular position is compared with the calculated limit value to check whether the provisional target angular position is equal to or lower than the limit value (Step S45). When a judgment is made that the provisional target angular position is equal to or lower than the limit value, the received provisional target angular position is output as a final target angular position (Step S46), and when a judgment is made that the provisional target angular position is larger than limit value, the calculated limit value is output as a final target angular position (Step S47). It is noted that, although Step S45 relates to the limit for rotational angular positions in the positive direction, a similar process is applied to rotational angular positions in the negative direction.

Thereafter, in Step S48, a check is made whether the sequence of processing steps is to be terminated, and when the sequence of professing steps is not to be terminated, the processes of Step S42 and the subsequent steps are repeated.

On the basis of the actual angular position of the steering mechanism 51 detected by the stroke-amount detecting sensor 15 and the final target angular position output from the target-angular-position limiting section 44, the actuating control section 45 actuates the actuating mechanism 10 to thereby change the angular position of the steering mechanism 51 so that they correspond to each other.

According to the aircraft (steering control equipment 1) of the embodiment thus configured, while the aircraft is taxiing, the traveling speed is detected as ground speed by the ground-speed detecting sensor 26 and the traveling speed is detected as airspeed by the airspeed detecting sensor 27, and the traveling speed is set by the speed setting section 31 on the basis of the detected ground speed and airspeed. Further, the actual angular position of the steering mechanism 51 is detected by the stroke-amount detecting sensor 15.

When the pilot operates the steering handle 21 or the rudder pedals 22, the rotational amount of the steering handle 21 is detected by the rotational-amount detecting sensor 23 and the stepping amount of the rudder pedals 22 is detected by the stepping-amount detecting sensor 24.

Then, a first provisional target angular position of the steering mechanism 51 corresponding to the rotational amount of the steering handle 21 detected by the rotational-amount detecting sensor 23 is calculated by the provisional-target-angular-position calculating section 35. When, for example, the calculated first provisional target angular position has a positive value and the value is equal to or lower than the limit value corresponding to the ground speed detected by the ground-speed detecting sensor 26, the first provisional target angular position is output as a second provisional target angular position by the target-angular-position limiting section 37, and when the first provisional target angular position is larger than the limit value, the limit value is output as a second provisional target angular position by the target-angular-position limiting section 37.

On the other hand, a first provisional target angular position of the steering mechanism 51 corresponding to the stepping amount of the rudder pedals 22 detected by the stepping-amount detecting sensor 24 is calculated by the provisional-target-angular-position calculating section 39, and the calculated first provisional target angular position is multiplied by a gain corresponding to the airspeed detected by the airspeed detecting sensor 27 by the gain multiplying section 40 and a second provisional target angular position is thereby calculated.

The second provisional target angular position output from the target-angular-position limiting section 37 and the second provisional target angular position calculated by the gain multiplying section 40 are added up by the target-angular-position adding section 41. When, for example, the added-up provisional target angular position has a positive value and the value is equal to or lower than the limit value corresponding to the traveling speed set by the speed setting section 31, the added-up provisional target angular position is output as a final target angular position by the target-angular-position limiting section 44, and when the added-up provisional target angular position is larger than the limit value, the limit value is output as a final target angular position by the target-angular-position limiting section 44. On the basis of the final target angular position thus output and the actual angular position detected by the stroke-amount detecting sensor 15, the steering mechanism 51 is actuated by the actuating control section 45. Thereby, the angular position of the steering mechanism 51 is changed and the traveling direction of the aircraft is thereby changed.

Thus, according to the aircraft (steering control equipment 1) of the embodiment, since the speed of the aircraft which is used for limiting the target angular position in the target-angular-position limiting section 44 is set to the speed set by the speed setting section 31 on the basis of the ground speed and the airspeed, it is possible to use a more suitable speed as compared with a case where only the ground speed is used and a case where only the airspeed is used. Thereby, it is possible to suitably limit the target angular position.

Generally, the steering mechanism 51 is manipulated by means of the steering handle 21 mainly when the aircraft moves between an apron and a runway, and at this time the traveling speed is low and the traveling direction of the aircraft is often changed by a large angle. On the other hand, the steering mechanism 51 is manipulated by the rudder pedals 22 mainly when the aircraft runs on a runway at the time of taking-off and at the time of landing, and at this time the traveling speed is high and the rudder pedals 22 is manipulated for tweaking the traveling direction. Further, since, when the ruder pedals 22 is manipulated, the angular position of the rudder of the vertical tail is also changed in association therewith, it is necessary to taken into consideration the steering effect of the rudder when the traveling speed is high.

Basically, when the aircraft is traveling at a low speed at which the steering handle 21 is usually used, that is, when the traveling speed is lower than a reference speed at and above which it is not necessary to control the angular position of the steering mechanism 51 by means of the steering handle 21, limiting the target angular position of the steering mechanism 51 on the basis of the ground speed makes it possible to prevent the occurrence of disadvantages occurring when limiting on the basis of the airspeed, such as disadvantages that a speed higher than the actual speed is detected due to head winds and it is therefore not possible to change the traveling direction of the aircraft by a large angle, and that a speed lower than the actual speed is detected due to fair winds and the limit value is therefore easier (larger) than that at the actual speed. Further, when the aircraft is traveling at a high speed at which the rudder pedals 22 is usually used, that is, when the traveling speed is equal to or higher than the reference speed, limiting the target angular position of the steering mechanism 51 on the basis of the airspeed makes it possible to prevent the occurrence of disadvantages occurring when limiting on the basis of the ground speed, such as a disadvantage that, when the steering effect of the rudder is larger than the actual speed due to head winds, the traveling direction of the aircraft is easily changed and it is therefore difficult to tweak the traveling direction. However, where uniformly the target angular position of the steering mechanism 51 is limited on the basis of the ground speed when the traveling speed is lower than the reference speed and limited on the basis of the airspeed when the traveling speed is equal to or higher than the reference speed, when the ground speed and the airspeed is not equal to each other, switching the traveling speed between the ground speed and the airspeed causes discontinuity of the limit value of the target angular position, which results in deterioration of the controllability.

Therefore, when the traveling speed is switched between the ground speed, the airspeed and the reference speed as described above, it is possible to prevent the discontinuity of the limit value of the target angular position within a speed range in which the traveling speed is switched between the ground speed, the airspeed and the reference speed, thereby preventing the deterioration of the controllability.

Further, since the target-angular-position limiting section 37 is provided, it is possible to prevent a problem occurring in a case where only the target-angular-position limiting section 44 is provided. That is, in a case where only the target-angular-position limiting section 44 is provided, since the target-angular-position limiting section 44 limits the target angular position of the steering mechanism 51 after the provisional target angular positions corresponding to the operation amount of the steering handle 21 and to the operation amount of the rudder pedals 22 are added up, in order that the angular position of the steering mechanism 51 can be changed by means of the rudder pedals 22, it is not possible to, even within a speed range above the reference speed, limit the target angular position corresponding to the operation amount of the steering handle 21 to 0. However, in the above-described configuration, since it possible to limit only the target angular position corresponding to the operation amount of the steering handle 21 by means of the target-angular-position limiting section 37, it is possible to limit the target angular position corresponding to the operation amount of the steering handle 21 to 0 within the speed range over the reference speed. Thereby, it is possible to more closely limit the target angular position and thereby improve the safety.

Further, since the traveling speed used in the target-angular-position limiting section 37 is the ground speed, it is possible to prevent the occurrence of the above-described disadvantages occurring when the target angular position is limited on the basis of the airspeed, such as disadvantages that a speed higher than the actual speed is detected due to head winds and the traveling direction of the aircraft therefore cannot be changed by a large angle and that a speed lower than the actual speed is detected due to fair winds and the limit value is therefore larger than that at the actual speed.

Furthermore, the gain multiplying section 40 of the pedal-part calculation section 38 multiplies a first provisional target angular position corresponding to the stepping-amount of the rudder pedals 22 by a gain corresponding to the airspeed to thereby calculate a second provisional target angular position, and calculates the second provisional target position so that, regardless of the operation amount, the second provisional target angular position becomes smaller as the traveling speed of the aircraft becomes higher. Therefore, it is possible to improve the safety more and it is possible to prevent the occurrence of the above-described disadvantages occurring when limiting on the basis of the ground speed, such as a disadvantage that, when the steering effect of the rudder is larger than the actual speed due to head winds, the traveling direction of the aircraft is easily changed and it is therefore difficult to tweak the traveling direction.

Thus, one embodiment of the present disclosure has been described. However, a specific embodiment in which the present disclosure can be implemented is not limited thereto.

Figure 11:
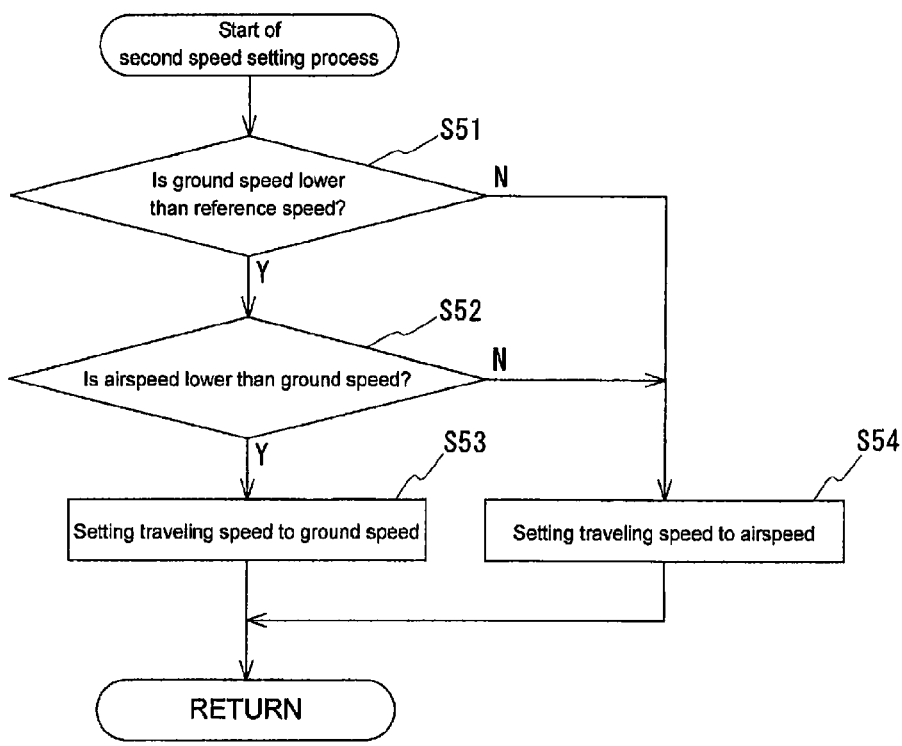
FIG. 11 is a flowchart showing a second speed setting process in the speed setting section according to another embodiment of the present disclosure.
Figure 12:
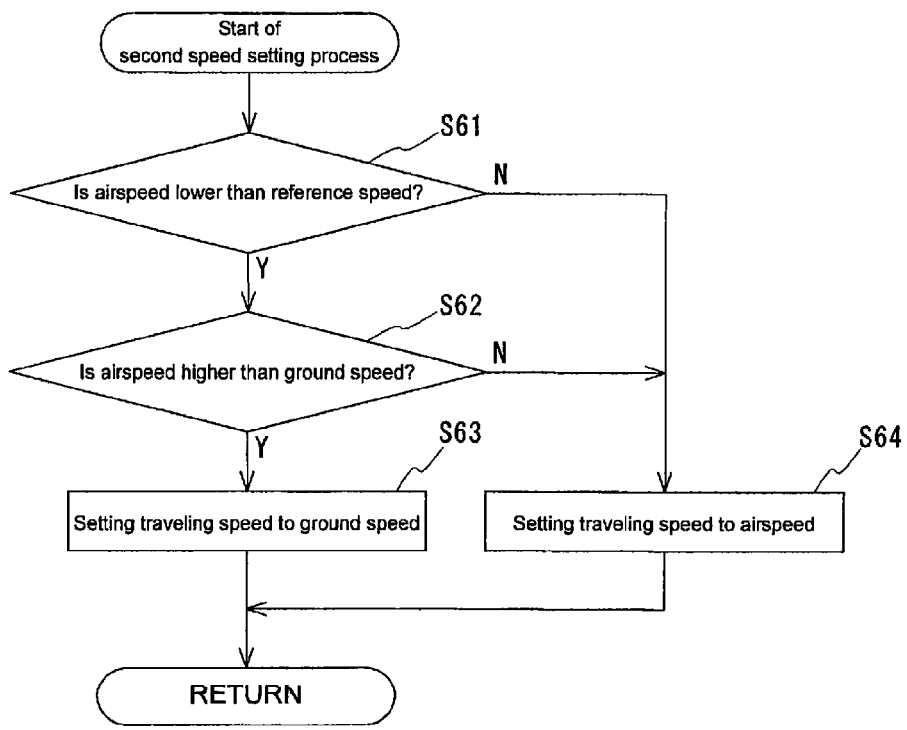
FIG. 12 is a flowchart showing a second speed setting process in the speed setting section according to another embodiment of the present disclosure.

Although, in the above embodiment, the speed setting section 31 is configured to execute the second speed setting process shown in FIG. 5, the configuration is not limited thereto and the speed setting section 31 may be configured to execute a second speed setting process as shown in FIG. 11 or a second speed setting process as shown in FIG. 12, for example.

In the embodiment shown in FIG. 11, the speed setting section 31 initially checks whether the ground speed is lower than the reference speed (Step S51), and when judging that the ground speed is lower than the reference speed, further checks whether the airspeed is lower than the ground speed (Step S52). When judging that the airspeed is lower than the ground speed, the speed setting section 31 sets the traveling speed to the ground speed (Step S53).

On the other hand, when in Step S51 a judgment is made that the ground speed is equal to or higher than the reference speed, and when in Step S52 a judgment is made that the airspeed is equal to or higher than the ground speed, the traveling speed remains set to the airspeed (Step S54). After the traveling speed is set to any one of the ground speed and the airspeed, the processing is returned to the main process shown in FIG. 3.

In the embodiment shown in FIG. 12, the speed setting section 31 initially checks whether the airspeed is lower than the reference speed (Step S61), and when judging that the airspeed is lower than the reference speed, further checks whether the airspeed is higher than the ground speed (Step S62). When judging that the airspeed is higher than the ground speed, the speed setting section 31 sets the traveling speed to the ground speed (Step S63).

On the other hand, when in Step S61 a judgment is made that the airspeed is equal to or higher than the reference speed and when in Step S62 a judgment is made that the airspeed is equal to or lower than the ground speed, the traveling speed remains set to the airspeed (Step S64). After the traveling speed is set to any one of the ground speed and the airspeed, the processing is returned to the main process shown in FIG. 3.

When the speed setting section 31 is configured to execute the second speed setting process shown in FIG. 11 or the second speed setting process shown in FIG. 12, a similar effect to that described above can be obtained. It is noted that the purpose of performing the processes shown in FIGS. 5, 11 and 12 is to prevent the discontinuity of the limit value of the target angular position within a speed range in which the traveling speed is switched between the ground speed, the airspeed and the reference speed. Further, although it is different depending on how the limit data (limit value) and the reference speed are set, since the discontinuity of the limit value is the smallest when the process shown in FIG. 5, among the processes shown in FIGS. 5, 11 and 12, is performed, it is the most preferable to employ the process shown in FIG. 5. Further, instead of switching the traveling speed between the ground speed, the airspeed and the reference speed as described above, a configuration may be possible in which the traveling speed is set to the ground speed when the ground speed or the speed is lower then the reference speed, and is set to the airspeed when the ground speed or the airspeed is equal to or higher than the reference speed.

Further, although, in the above embodiment, the reference speed is set to 80 knot as an example, the reference speed may be 70 knot or 90 knot and it is possible to appropriately set the reference speed. Additionally, in a case where two pilots, a pilot and a co-pilot, control the aircraft, when a steering handle 21 and rudder pedals 22 for the pilot are provided and a steering handle 21 and rudder pedals 22 for the co-pilot are also provided, a configuration is possible in which a provisional target angular position is calculated on the basis of the operation amounts of the steering handles 21 and on the basis of the operation amounts of the rudder pedals 22, and the calculated provisional target angular positions are added up and the added-up provisional target angular position is limited.

It is noted that the provisional target angular position corresponding to the operation amounts of the steering handles 21 may be obtained by adding up a provisional target angular position corresponding to the operation amount of the steering handle 21 for the pilot and a provisional target angular position corresponding to the operation amount of the steering handle 21 for the co-pilot, or by comparing them with each other and employing the smaller or larger one, or by employing the provisional target angular position corresponding to the operation amount of either one of the steering handles 21 for the pilot and for the co-pilot according to a selection switch. Further, for the rudder pedals 22, the provisional target angular position corresponding to operation amounts of the rudder pedals 22 can be obtained in the similar way.

Furthermore, although, in the above embodiment, the manipulating section 20 has the steering handle 21 and the rudder pedals 22, the manipulating section does not necessarily have both of the steering handle 21 and the rudder pedals 22 and may have either one of the steering handle 21 and the rudder pedals 22.

Further, although the second provisional target angular position output from the target-angular-position limiting section 37 and the second provisional target angular position calculated by the gain multiplying section 40 are added up in the target-angular-position adding section 41, a configuration is possible in which a selecting section is provided instead of the target-angular-position adding section 41 and the selection section outputs either one of the provisional target angular positions, for example, by comparing them with each other and outputting the smaller or larger one.

Furthermore, although the target-angular-position limiting section 44 limits the added-up provisional target angular position added up by the target-angular-position adding section 41, a configuration is possible in which a gain multiplying section is provided instead of the target-angular-position limiting section 44 and the gain multiplying section multiplies the provisional target angular position added up by the target-angular-position adding section 41 by a gain corresponding to the traveling speed set by the speed setting section 31 to thereby calculate a final target angular position. Alternatively, a configuration is possible in which, on the basis of the provisional target angular position added up by the target-angular-position adding section 41 and the traveling speed set by the speed setting section 31, the final-target-angular-position calculating section 42 refers to a map in which a final target angular position is set corresponding to the provisional target angular position and the traveling speed to thereby calculate a final target angular position.

Furthermore, the handle-part calculation section 34 may calculate a second provisional target angular position by multiplying the first provisional target angular position calculated by the provisional-target-angular-position calculating section 35 by a gain corresponding to the ground speed detected by the ground-speed detecting sensor 26, or by, on the basis of the first provisional target angular position calculated by the provisional-target-angular-position calculating section 35 and the ground speed detected by the ground-speed detecting sensor 26, referring a map in which a second provisional target angular position is set corresponding to the first provisional target angular position and the ground speed.

Further, the pedal-part calculation section 38 may calculate the second provisional target angular position by, when the first provisional target angular position calculated by the provisional-target-angular-position calculating section 39 is equal to or lower than the limit value corresponding to the airspeed detected by the airspeed detecting sensor 27, outputting the first provisional target angular position as a second provisional target angular position, and when the first provisional target angular position is larger than the limit value, outputting the limit value as the second provisional target angular position, or by, on the basis of the first provisional target angular position calculated by the provisional-target-angular-position calculating section 39 and the airspeed detected by the airspeed detecting sensor 27, referring to a map in which a second provisional target angular position is set according to the first provisional target angular position and the airspeed.

It is noted that, when calculating a second provisional target angular position in the handle-part calculation section 34, the speed used therefor may be the airspeed or the speed set by the speed setting section 31 instead of the ground speed, and when calculating a second target angular position in the pedal-part calculation section 38, the speed used therefor may be the ground speed or the speed set by the speed setting section 31 instead of the airspeed.

What is claimed is:

1. A method of controlling a steering control equipment for an aircraft which changes a traveling direction of the aircraft by changing an angular position of a steering mechanism of the aircraft while the aircraft is taxiing, the method comprising:

providing a steering handle operably coupled to the steering mechanism and configured to output an operation amount of the steering handle;

providing rudder pedals operably coupled to the steering mechanism and configured to output an operation amount of the rudder pedals;

providing angular-position detecting means for detecting the actual angular position of the steering mechanism;

providing ground-speed detecting means for detecting a speed of the aircraft relative to the ground as a ground speed;

providing airspeed detecting means for detecting the speed of the aircraft relative to the air as an airspeed;

providing a controller operably coupled to the steering handle, rudder pedals, angular-position detecting means, ground-speed detecting means, and airspeed detecting means, the controller being configured to:

set a control speed of the aircraft on the basis of the ground speed and the airspeed;

calculate a target angular position of the steering mechanism by:

calculating a first component of a provisional target angular position of the steering mechanism based on the operation amount of the steering handle;

calculating a second component of the provisional target angular position of the of the steering mechanism based on the operation amount of the rudder pedals;

adding the first and second components of the provisional target angular position to obtain a summed provisional target angular position; and calculating a final target angular position based on the summed provisional target angular position and the control speed set by the speed setting section;

wherein at least one of the handle-part calculation section and the pedal-part calculation section is configured to calculate a provisional target angular position of the steering mechanism based on the operation amount of the steering handle, the operation amount of the rudder pedals, and at least one of the ground speed, air speed, and control speed; and actuate the steering mechanism so that the actual angular position of the steering mechanism coincides with the final target angular position.

2. A steering control equipment for an aircraft which changes a traveling direction of the aircraft by changing an angular position of a steering mechanism of the aircraft while the aircraft is taxiing, comprising:

a steering handle and rudder pedals configured to manipulate the steering mechanism, the steering handle outputting an operation amount of the steering handle and the rudder pedals outputting an operation amount of the rudder pedals;

actuating means for actuating the steering mechanism;

angular-position detecting means for detecting the actual angular position of the steering mechanism;

ground-speed detecting means for detecting a speed of the aircraft relative to the ground as a ground speed;

airspeed detecting means for detecting the speed of the aircraft relative to the air as an airspeed; and control means for causing the actuating means to change the angular position of the steering mechanism, wherein the control means includes:
- a speed setting section for setting a control speed of the aircraft on the basis of the ground speed and the airspeed;
- a target-angular-position calculating section for calculating a target angular position of the steering mechanism, including:
  - a handle-part calculation section for calculating a first component of a provisional target angular position of the steering mechanism based on the operation amount of the steering handle;
  - a pedal-part calculation section for calculating a second component of the provisional target angular position of the of the steering mechanism based on the operation amount of the rudder pedals;
  - a target-angular-position adding section for adding the first and second components of the provisional target angular position to obtain a summed provisional target angular position; and
  - a final-target-angular-position calculating section for calculating a final target angular position based on the summed provisional target angular position and the control speed set by the speed setting section;
  - wherein at least one of the handle-part calculation section and the pedal-part calculation section is configured to calculate a provisional target angular position of the steering mechanism based on the operation amount of the steering handle, the operation amount of the rudder pedals, and at least one of the ground speed, air speed, and control speed; and
- an actuating control section for actuating the actuating means so that actual angular position coincides with the final target angular position.

3. The steering control equipment of claim 2, in which the speed setting section is configured to set the control speed to the ground speed when the ground speed or the airspeed is lower than a reference speed at and above which it is not necessary to control the angular position of the steering mechanism by means of the steering handle, and to set the control speed to the airspeed when the ground speed or the airspeed is equal to or higher than the reference speed.

4. The steering control equipment of claim 3, in which:
the speed setting section is configured to switch the control speed of the aircraft between the ground speed, the airspeed, and the reference speed;
when the control speed is set to the ground speed, the speed setting section initially checks whether the ground speed is equal to or higher than the reference speed;
when the ground speed is detected to be lower than the reference speed, the control speed remains set to the ground speed; and
when the ground speed is detected to be equal to or higher than the reference speed, the speed setting section further checks whether the airspeed is equal to or higher than the reference speed and:
when the airspeed is detected to be equal to or higher than the reference speed, the control speed is set to the airspeed, and
when the airspeed is detected to be lower than the reference speed, the control speed is set to the reference speed.

5. The steering control equipment of claim 3, in which:
the speed setting section is configured to switch the control speed of the aircraft between the ground speed, the airspeed and the reference speed; and
when the control speed is set to the airspeed, the speed setting section checks whether the ground speed is lower than the reference speed and;
when the ground speed is detected to be lower than the reference speed, the control speed is set to the ground speed; and
when the ground speed is detected to be equal to or higher than the reference speed, the control speed remains set to the airspeed.

6. The steering control equipment of claim 3, in which:
the speed setting section is configured to switch the control speed of the aircraft between the ground speed, the airspeed and the reference speed;
when the control speed of the aircraft is set to the airspeed, the speed setting section initially checks whether the ground speed is lower than the reference speed;
when the ground speed is detected to be equal to or higher than the reference speed, the control speed remains set to the airspeed; and
when the ground speed is detected to be lower than the reference speed, the speed setting section further checks whether the airspeed is lower than the ground speed and;
when the airspeed is detected to be lower than the ground speed, the control speed is set to the ground speed; and
when the airspeed is detected to be equal to or higher than the ground speed, the control speed remains set to the airspeed.

7. The steering control equipment of claim 3, in which:
the speed setting section is configured to switch the control speed of the aircraft between the ground speed, the airspeed, and the reference speed;
when the control speed of the aircraft is set to the airspeed, the speed setting section initially checks whether the airspeed is lower than the reference speed;
when the airspeed is detected to be equal to or higher than the reference speed, the control speed of the aircraft remains set to the airspeed, and
when the airspeed is detected to be lower than the reference speed, the speed setting section further checks whether the airspeed is higher than the ground speed and;
when the airspeed is detected to be higher than the ground speed, the control speed of the aircraft is set to the ground speed; and
when the airspeed is detected to be equal to or lower than the ground speed, the control speed of the aircraft remains set to the airspeed.

8. The steering control equipment of claim 3, in which:
the speed setting section is configured to switch the control speed of the aircraft between the ground speed, the airspeed, and the reference speed;
when the control speed of the aircraft is set to the reference speed, the speed setting section checks whether the airspeed is equal to or higher than the reference speed;
when the airspeed is detected to be equal to or higher than the reference speed, the control speed is set to the airspeed; and
when the airspeed is detected to be lower than the reference speed, the control speed remains set to the reference speed.

9. An aircraft comprising:
a steering mechanism for changing a traveling direction of the aircraft by changing an angular position of the steering mechanism of the aircraft while the aircraft is taxiing; and
a steering control equipment for changing an angular position of the steering mechanism, the steering control equipment including:
- a steering handle and rudder pedals with which a pilot manipulates the steering mechanism, the steering handle outputting an operation amount of the steering handle and the rudder pedals outputting an operation amount of the rudder pedals;
- actuating means for actuating the steering mechanism;
- angular-position detecting means for detecting the actual angular position of the steering mechanism;
- ground-speed detecting means for detecting a speed of the aircraft relative to the ground as a ground speed;
- airspeed detecting means for detecting the speed of the aircraft relative to the air as an airspeed; and
- control means for causing the actuating means to change the angular position of the steering mechanism, wherein the control means includes:
  - a speed setting section for setting a control speed of the aircraft on the basis of the ground speed and the airspeed;
  - a target-angular-position calculating section for calculating a target angular position of the steering mechanism, including:
    - a handle-part calculation section for calculating a first component of a provisional target angular position of the steering mechanism based on the operation amount of the steering handle;
    - a pedal-part calculation section for calculating a second component of the provisional target angular position of the of the steering mechanism based on the operation amount of the rudder pedals;
  - a target-angular-position adding section for adding the first and second components of the provisional target angular position to obtain a summed provisional target angular position; and
  - a final-target-angular-position calculating section for calculating a final target angular position based on the summed provisional target angular position and the control speed set by the speed setting section;
  - wherein at least one of the handle-part calculation section and the pedal-part calculation section is configured to calculate a provisional target angular position of the steering mechanism based on the operation amount of the steering handle, the operation amount of the rudder pedals, and at least one of the ground speed, air speed, and control speed; and
- an actuating control section for actuating the actuating means so that actual angular position coincides with the final target angular position.

* * * * *